(12) United States Patent
Bradbury et al.

(10) Patent No.: US 11,365,595 B2
(45) Date of Patent: Jun. 21, 2022

(54) FLOW RATE TRIMMING DEVICE

(71) Applicant: Severn Unival Limited, Quedgeley (GB)

(72) Inventors: Andrew Bradbury, Quedgeley (GB);
Antony Brooke, Quedgeley (GB);
Mark Breese, Quedgeley (GB)

(73) Assignee: Severn Unival Limited

( * ) Notice: Subject to any disclaimer, the term of this patent is extended or adjusted under 35 U.S.C. 154(b) by 170 days.

(21) Appl. No.: 16/451,134

(22) Filed: Jun. 25, 2019

(65) Prior Publication Data

US 2020/0011144 A1    Jan. 9, 2020

(30) Foreign Application Priority Data

Jul. 6, 2018   (GB) ..................................... 1811108
Dec. 19, 2018  (GB) ..................................... 1820721

(51) Int. Cl.
| | | |
|---|---|---|
| *E21B 21/10* | (2006.01) | |
| *F16K 47/08* | (2006.01) | |
| *E21B 21/08* | (2006.01) | |
| *F16K 27/04* | (2006.01) | |
| *B33Y 80/00* | (2015.01) | |
| *F16K 47/00* | (2006.01) | |

(52) U.S. Cl.
CPC .............. *E21B 21/10* (2013.01); *E21B 21/08* (2013.01); *F16K 27/047* (2013.01); *F16K 47/08* (2013.01); *B33Y 80/00* (2014.12); *F16K 47/00* (2013.01); *Y10T 137/87925* (2015.04)

(58) Field of Classification Search
CPC ........ F16K 27/047; F16K 47/00; F16K 47/08; E21B 21/10; E21B 21/08; Y10T 137/87925
See application file for complete search history.

(56) References Cited

U.S. PATENT DOCUMENTS

| | | | | |
|---|---|---|---|---|
| 3,529,628 A | * | 9/1970 | Cummins | ............... F16K 47/08 137/625.3 |
| 3,722,854 A | * | 3/1973 | Parola | ..................... F16K 47/08 251/127 |
| 3,780,767 A | * | 12/1973 | Borg | ....................... F16K 47/08 137/625.3 |

(Continued)

FOREIGN PATENT DOCUMENTS

GB    2054103    2/1981

OTHER PUBLICATIONS

Intellectual Property Office, Patents Act 1977: Search Report under Section 17, dated Jun. 10, 2019, p. 1, UK.

*Primary Examiner* — Craig M Schneider
*Assistant Examiner* — Christopher D Ballman
(74) *Attorney, Agent, or Firm* — Anthony J. Bourget

(57) ABSTRACT

A flow rate trimming device is described comprising a body 12 defining a plurality of convoluted flow passages 22 extending between a first surface 16a of the body and a second surface 16b of the body 12, wherein at the first surface 16a each flow passage 22 defines an opening 24 having a lower edge and an upper edge, at least part of the lower edge of a first one of the openings 24 being at substantially the same level or lower than at least part of the upper edge of a second one of the openings 24, at least part of the upper edge of the first one of the openings 24 being higher than at least part of the upper edge of the second one of the openings 24.

28 Claims, 2 Drawing Sheets

(56) References Cited

U.S. PATENT DOCUMENTS

| | | | |
|---|---|---|---|
| 3,917,221 A * | 11/1975 | Kubota | F16K 47/08 251/127 |
| 3,921,668 A * | 11/1975 | Self | F16L 55/02781 137/625.3 |
| 3,941,350 A * | 3/1976 | Kluczynski | F16K 47/08 251/127 |
| 4,050,479 A * | 9/1977 | Baumann | F16K 47/08 138/42 |
| 4,249,574 A * | 2/1981 | Schnall | F15C 1/02 137/625.3 |
| 2,126,991 A | 8/1983 | Griswold | |
| 4,398,563 A * | 8/1983 | Kay | F16K 3/34 137/625.3 |
| 4,567,915 A * | 2/1986 | Bates | F16K 47/08 137/625.3 |
| 4,593,446 A * | 6/1986 | Hayner | F16K 47/08 137/625.28 |
| 4,938,450 A * | 7/1990 | Tripp | F16K 47/08 251/30.03 |
| 5,018,703 A * | 5/1991 | Goode | F16K 47/08 137/625.3 |
| 5,390,896 A * | 2/1995 | Smirl | F16K 47/08 137/625.3 |
| 6,926,032 B2 * | 8/2005 | Nawaz | F16K 47/04 137/625.33 |
| 7,069,950 B1 * | 7/2006 | Bittner | F16K 47/08 137/625.37 |
| 7,690,400 B2 * | 4/2010 | Haines | F16K 47/08 138/42 |
| 9,151,407 B2 * | 10/2015 | Fontaine | F16K 47/04 |
| 10,302,224 B2 * | 5/2019 | Kluz | F16K 47/08 |
| 10,655,738 B2 * | 5/2020 | McCaskill | F16K 3/246 |
| 10,871,243 B2 * | 12/2020 | Sander | F16K 47/08 |
| 2007/0028977 A1 * | 2/2007 | Goulet | F15D 1/0015 137/809 |

* cited by examiner

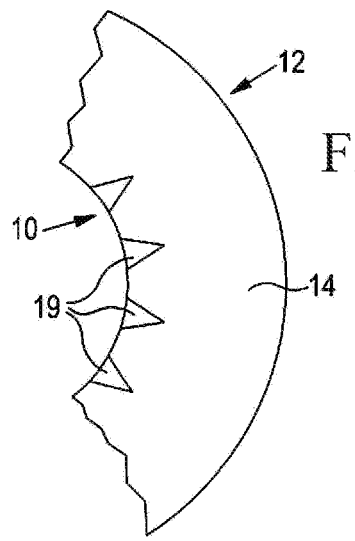
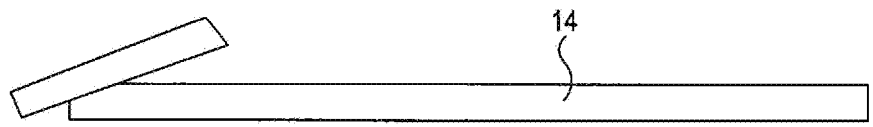
Fig. 4a
Fig. 4b
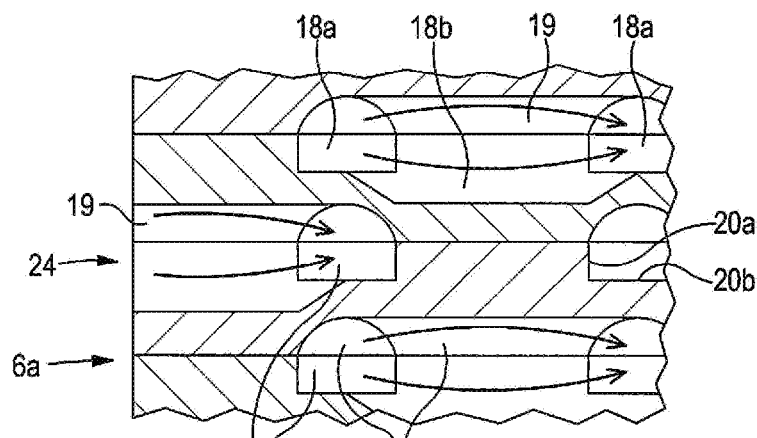
Fig. 5
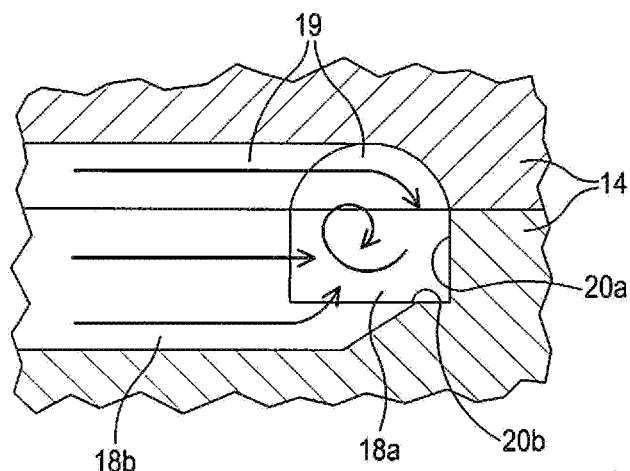
Fig. 6

FLOW RATE TRIMMING DEVICE

This invention relates to a device for use in trimming the flow rate of fluid through, for example, a valve or venting device.

A number of flow rate trimming devices are known. By way of example, one form of flow rate trimming device in common use takes the form of a series of plates, typically of annular form, the plates being positioned one adjacent another to form a stack. Within the stack, each plate has a series of grooves formed therein leading in a convoluted fashion between the inner and outer peripheries of the plate. The grooves may comprise a series of concentric annular grooves interconnected by staggered radially extending grooves. The stack of the plates formed therefrom defines a series of convoluted flow passages extending between the inner and outer peripheries of the stack, each passage being defined by the grooves in one of the plates and the adjacent flat face of an adjacent one of the plates. Each groove, and hence each flow passage, is of generally square or rectangular form. The flow passages defined by each plate are independent of the flow passages defined by others of the plates.

In use, part of a valve member projects into the central opening of the stack. When the valve member occupies a closed position, the ends of the flow passages defined by all of the plates will be closed by the valve member. As the valve member is moved towards a fully opened position, the inner ends of the flow passages will be opened in turn, plate by plate.

When the valve is partly or fully open, it will be appreciated that fluid flowing through the valve must follow the convoluted flow passages defined by the stack of plates, and the requirement for the fluid to follow these passages, undergoing a series of changes in flow direction within the stack of plates, restricts or trims the flow rate of the fluid through the valve.

Whilst such flow rate trimming devices operate satisfactorily and have been in use for a number of years, as part of the thickness of each plate has to be of non-grooved form in order to maintain the required isolation between the flow passages defined by adjacent plates, the stack includes dead bands in which opening movement of the valve member over a significant distance does not result in an increased flow area being formed at the surface of the flow rate trimming device. As a consequence of the presence of these dead bands, smooth control is difficult to achieve.

In use, the stack has significant clamping loads applied thereto, and it is important to ensure that the presence of the flow passages within the trimming device does not excessively weaken the stack to such a degree that the clamping loads cannot be withstood.

Depending upon the application in which the trimmer device is employed, it may be required to achieve a significant flow rate trimming effect using a device of relatively restricted dimensions.

It is an object of the invention to provide a flow rate trimming device in which at least some of the disadvantages associated with known arrangements are overcome or are of reduced effect.

According to a first aspect of the invention there is provided a flow rate trimming device comprising a body defining a plurality of convoluted flow passages extending between a first surface of the body and a second surface of the body, each convoluted passage comprising a plurality of annular flow passages interconnected by a plurality of radially extending flow passages, wherein at the first surface each radially extending flow passage defines an opening having a lower edge and an upper edge, at least part of the lower edge of a first one of the openings being at substantially the same level or lower than at least part of the upper edge of a second one of the openings, at least part of the upper edge of the first one of the openings being higher than at least part of the upper edge of the second one of the openings.

For each convoluted flow passage, the annular and radial flow passages forming the convoluted flow passage are preferably axially aligned with one another within the body.

The annular flow passages may be of reduced axial extent relative to the openings.

It will be appreciated that in such an arrangement, the openings are arranged in a staggered formation, and that no dead band, or a significantly reduced dead band is formed between the first and second ones of the openings. Consequently, better control may be achieved than is achieved with a conventional flow rate trimming device in which such a dead band is present.

Whilst the openings could be of square or rectangular shape, preferably the upper and/or lower edges thereof are of substantially arched form. The arched form may be smoothly curved, for example being of part circular or part elliptical form, or may be of part polygonal form, being made up of two or more straight sections. The use of such a shape is advantageous in that the strength of the part of the body in which the openings are formed may be enhanced. The body may thus be better able to withstand the clamping loads applied thereto, in use.

Although just the openings and adjacent radial flow passages may be of substantially arched form, parts of the remainder of the convoluted passages may also have upper and/or lower walls of substantially arched form. Whilst the convoluted flow passages may be of substantially constant cross-sectional shape and size along their entire lengths, this need not always be the case and arrangements are possible in which the cross-sectional shapes and/or sizes of the passages vary along their lengths. By way of example, where of reduced height the passages may be of increased width to ensure that the cross-sectional area of the passage is maintained at an acceptable level.

As described above, the convoluted flow passages comprise a series of, preferably concentric, annular passages interconnected by, preferably staggered, radial flow passages such that fluid flowing through the convoluted flow passages between the first and second surfaces has to undergo a series of changes in flow direction. By way of example, the fluid flow direction may undergo ten 90° changes in flow direction. Where the flow passages are of arched form, at the intersections between at least some of the radial and the annular parts of the flow passages, additional turbulence may be generated in the fluid flow which further assists in fluid flow rate control, the additional turbulence being imparted by impingement of the flow with the arched surfaces imparting an axial or vertical component to flow which would otherwise be generally radial or horizontal.

The body may be composed of a plurality of plates arranged in a stack, each plate having a groove of convoluted shape formed therein. In one embodiment, the groove is of square or rectangular cross-sectional shape and a corresponding recess of, for example, arch shaped form is provided in the facing surface of the adjacent plate to result in the formation of a passage of arch shaped form. The recess could be formed by milling or grinding at an angle to the face of the plate, resulting in the formation of a recess of arched form and of tapering height and width. However, other structures are possible. For example, shapes other than square or rectangular shapes for the groove may be used, including shapes in which the base of the groove is of curved form. In either case, the groove and the adjacent recessed face of the adjacent one of the plates together define each convoluted flow passage. Alternatively, the body may be of one piece construction, for example manufactured using an additive manufacturing process, such as a 3D printing process, to form the body with the flow passages formed therein. The formation of substantially arch shaped flow passages may be easier, when manufactured using a 3D printing process, than the formation of flow passages of generally square or rectangular cross sectional shape, as the arched upper walls of the flow passages are better able to support themselves.

Where fabricated by 3D printing, the fabrication method conveniently comprises forming a plate of the form described hereinbefore, including the grooves and recesses, by 3D printing, and then 3D printing thereon additional plates to form the completed body.

The body is preferably of generally hollow cylindrical shape, the inner cylindrical surface of the body defining the first surface and the outer cylindrical surface of the body defining the second surface. A valve member may cooperate with the first surface, the position of the valve member controlling which of the openings are open and which are obscured at any given time.

According to another aspect of the invention there is provided a flow rate trimming device comprising a body defining a plurality of convoluted flow passages extending between a first surface of the body and a second surface of the body, wherein the upper and/or lower walls of the flow passages are, at least in part, of substantially arched form. The arched form may be smoothly curved, for example being of part circular or part elliptical form, or may be of part polygonal form, being made up of two or more straight sections. As mentioned hereinbefore, the use of such a shape is advantageous in that the strength of the part of the body in which the openings are formed may be enhanced. The trimming device may incorporate various one of the features recited hereinbefore.

The invention will further be described, by way of example, with reference to the accompanying drawings, in which:

FIGS. 4a and 4b illustrate the formation of recesses in a plate;

FIG. 5 is a view similar to FIG. 2 illustrating an alternative embodiment; and FIG. 6 is an enlarged diagrammatic view of part of a plate.

Figure 1:
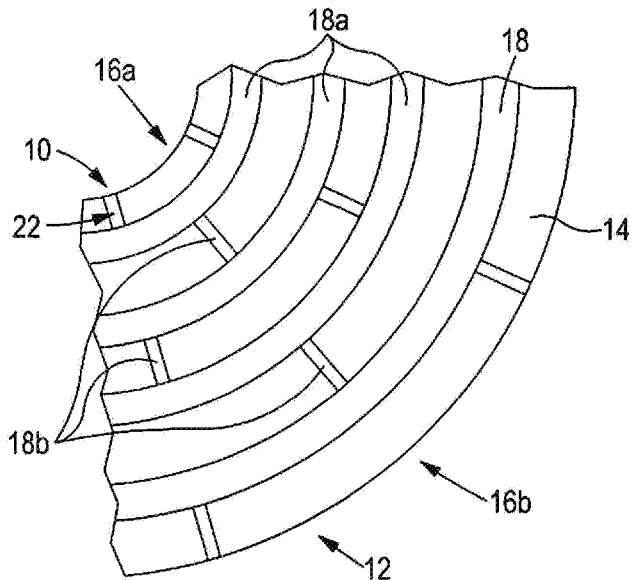
FIG. 1 is a diagrammatic view illustrating part of a plate of a flow rate trimming device in accordance with an embodiment of the invention.

Referring to the accompanying drawings, a fluid flow trimming device 10 is illustrated, the device 10 being in the form of a body 12 made up of a plurality of plates 14 stacked one upon another. Each plate 14 is of annular form, and the stack of plates takes the form of a hollow cylinder defining a first, inner cylindrical surface 16a and a second, outer cylindrical surface 16b.

Each plate 14 is formed on a surface thereof with a groove 18 of convoluted form. Each groove 18 is made up of a series of concentric rings 18a interconnected by a series of radial passages 18b. The passages 18b are arranged in a staggered configuration, as shown in FIG. 1. Each groove 18 is axially spaced from the other grooves 18, and is made up of axially aligned rings 18a and passages 18b.

Each groove 18 is defined by a pair of parallel sidewalls 20a and a base wall 20b. Each groove 18 is of generally square or rectangular cross sectional shape in this arrangement. It will be appreciated, however, that this need not always be the case and other shapes, for example having curved side or base walls, are possible within the scope of the invention.

In addition, the face of the adjacent plate 14 is formed with recesses 19 of arched form and aligned with some or all of the groove 18 to result in the formation of a flow passage 22 of arched form along part or all of the length thereof. In the arrangement shown in FIGS. 1 to 3, the recesses 19 are located just adjacent those ones of the radial passages 18b located adjacent the inner periphery of the body 12, but it will be appreciated that the invention is not restricted in this regard and the recesses 19 may be located elsewhere, if desired, for example as shown in others of the drawings.

It will be appreciated that with the plates 14 stacked upon one another, the groove 18 in each plate 14, along with the adjacent surface of the adjacent one of the plates 14, and the recesses 19 formed therein, together result in the formation of a series of convoluted fluid flow passages 22 extending between the first and second surfaces 16a, 16b. In the vicinity of the recesses 19, each fluid flow passage 22 is of substantially arch shaped cross-sectional shape, but elsewhere it may be of rectangular cross sectional shape. As with the grooves 18, each flow passage 22 is axially spaced from each other passage 22 and is made up of axially aligned radial and annular parts.

Figure 2:
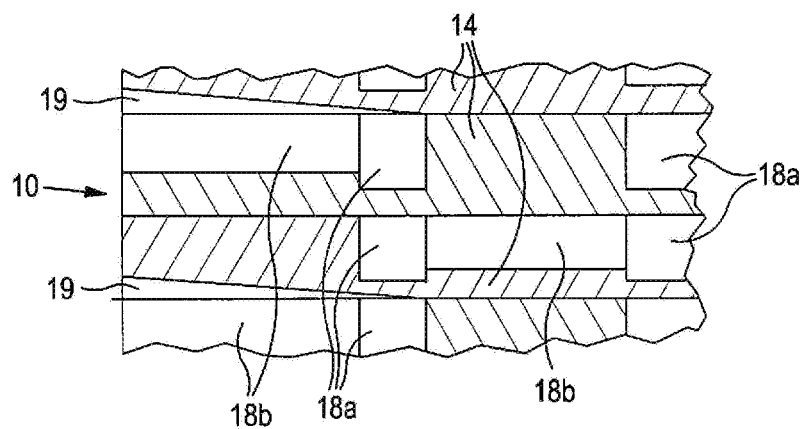
FIG. 2 is a diagrammatic cross-sectional representation of part of a flow rate trimming device incorporating the plate of FIG. 1.
Figure 3:
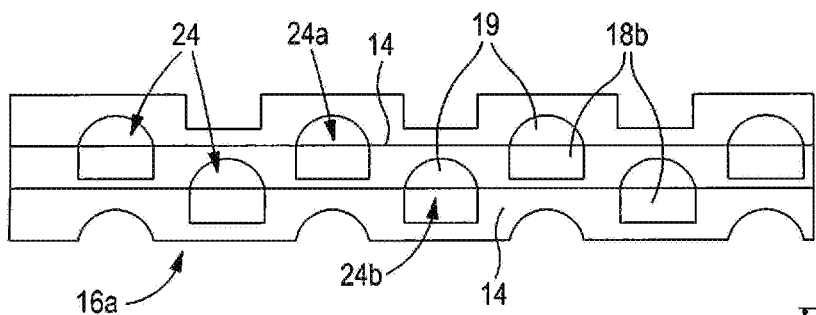
FIG. 3 is a diagrammatic representation of part of the first surface of the flow rate trimming device of FIGS. 1 and 2.

Where, as shown in FIG. 2, the flow passages 22 open to the first surface 16a, it will be appreciated that a series of openings 24 are formed. Adjacent each opening 24, one of the recesses 19 is formed so that the opening 24 is of increased height relative to the depth of the groove 18. As a result it will be appreciated that the lower edge of a first one of the openings 24a will be at substantially the same height as or lower than the upper edge of a second one of the openings 24b. Accordingly, in use, as a valve located within the central bore or passage of the device 10 moves, it will gradually exposed or obscure more of the openings. The presence of significant dead bands in the range of movement of the valve member in which no change in the exposed area of the openings occurs is thus reduced or avoided. By reducing or avoiding the presence of such dead bands in the flow trimmer device, it will be appreciated that a smoother degree of control may be achieved.

The recesses 19 may be formed by performing a grinding or milling operation on the underside of the plate 14 with the grinding or milling tool angled to the face of the plate 14, as shown in FIG. 4a, leading to the formation of a recess 19 of arch shaped cross-section and of tapering depth and width, as shown in FIG. 4b.

The use of flow passages regions of substantially arch shaped form within the body 12 is advantageous in that such shapes have good load bearing characteristics. The fluid flow rate trimmer device may thus readily be able to bear the clamping loads or the like applied thereto in normal use. Accordingly, recesses 19 need not be located just at the openings 24 but it may be preferred to also, or alternatively, include them elsewhere within the body 12, for example as shown in FIG. 5. The design may allow deadbands to be eliminated even where plates of relatively great thickness are employed. Consequently, the invention may allow devices to be of enhanced robustness.

Another advantage of using flow passages of substantially arch shaped form is that at the intersections between the radial passages 18b and the concentric rings 18a, the fluid is not only forced to undertake a substantially 90° change in flow direction within the plane of the plate 14 and to comingle with other flows, as the flow changes from flowing radially to taking a tangential flow direction (or vice versa) but in addition may be urged to include an axial component (vertical in the orientation shown in FIGS. 5 and 6) as it flows out of the recess 19 into one of the rings 18a, resulting in the formation of increased turbulence in the fluid flow. The increased turbulence in the flow serves to increase the resistance to fluid flow and so aids in the formation of a flow rate trimming effect, in use.

As the device 10 is able to control the flow rate in an improved, more efficient manner, a given level of trimming may be achieved using a trimmer of reduced dimensions, or an overall increase in the level of trimming that can be achieved is possible.

Although in the arrangement described hereinbefore the body 12 takes the form of a stack of plates 14 each of which is formed with a groove 18, with recesses 19 being formed on the plates 14, the device 10 may be fabricated using other techniques. By way of example, it may be fabricated using an additive manufacturing technique such as 3D printing. The presence of arch shaped flow passages is relatively easy to form using such techniques as the arch shape is relatively self-supporting. Such manufacturing techniques may readily permit the formation of features equivalent to the recesses 19 at locations spaced from the inner and outer peripheries of the device.

Where formed by 3D printing, the fabrication method conveniently comprises printing a formation equivalent to one of the aforementioned plates 14 (with the grooves and recesses formed therein), and printing further formations equivalent to additional plates 14 directly onto the aforementioned formation.

The flow passages 22 may be of substantially uniform cross-sectional size and shape along their lengths (other than at the openings 24). However, where adjacent ones of the plates 14 include regions of the groove 18 that are aligned with one another, such as the annular rings 18a, it may be preferred for the aligned regions to be of a reduced depth in order to clearly separate the flow passages 22 from one another. Where recesses 19 are associated with the annular rings 18a, as shown, such a variation in cross sectional shape to enable separation of the flow passages from one another may be especially important. Where of reduced depth, they may be of increased width so as to maintain a desired cross-sectional flow area. In some circumstances, it may be desired for the cross-sectional area to vary, for example increasing with increasing distance from the axis of the body 12.

Whilst in the arrangements described hereinbefore, the grooves 18 are of smoothly curved, arched profile, the curved regions being of part circular or part elliptical shape, the invention is not restricted in this regard and the arched parts may be of part polygonal form, being made up of two or more flats meeting one another at sharp apices. Furthermore, each of the grooves 18 may be of arched form at, for example, the top and bottom of the passage.

Although the description hereinbefore is directed primarily to the use of the invention in association with a valve, it will be appreciated that it may also be used in a venting device, controlling the rate at which a fluid such as steam is vented from a system.

Although a specific arrangement has been described hereinbefore with reference to the accompanying drawings, it will be appreciated that a number of modifications and alterations may be made to the arrangement described without departing from the scope of the invention as defined by the appended claims.

The invention claimed is:

1. A flow rate trimming device comprising a body formed by a plurality of plates, the body defining a plurality of convoluted flow passages extending between a first surface of the body and a second surface of the body, each convoluted passage comprising a plurality of annular flow passages interconnected by a plurality of radially extending flow passages, wherein at the first surface each radially extending flow passage defines an opening having a lower edge and an upper edge, at least part of the lower edge of a first one of the openings, the first one of the openings provided by a first and second of the plurality of plates and being at the same level or lower than at least part of the upper edge of a second one of the openings, the second one of the openings provided by the second and a third of the plurality of plates, at least part of the upper edge of the first one of the openings being higher than at least part of the upper edge of the second one of the openings.

2. A device according to claim 1, wherein for each convoluted flow passage, the annular and radial flow passages forming the convoluted flow passage are axially aligned with one another within the body.

3. A device according to claim 1, wherein the upper and/or lower edges of the openings are of substantially arched form.

4. A device according to claim 3, wherein the arched form is smoothly curved.

5. A device according to claim 4, wherein the arched form is of part circular or part elliptical form.

6. A device according to claim 3, wherein the arched form is of part polygonal form, made up of two or more straight sections.

7. A device according to claim 1, wherein the convoluted passages have upper and/or lower walls of substantially arched form.

8. A device according to claim 7, wherein the upper and/or lower edges of the convoluted passages are of substantially arched form.

9. A device according to claim 8, wherein the arched form is smoothly curved.

10. A device according to claim 9, wherein the arched form is of part circular or part elliptical form.

11. A device according to claim 7, wherein the arched form is of part polygonal form, made up of two or more straight sections.

12. A device according to claim 1, wherein the body is composed of a plurality of plates arranged in a stack, each plate having a groove of convoluted shape formed therein, the face of an adjacent plate having a recess formed therein aligned with at least part of the groove, the groove in each plate, and the adjacent recessed face of an adjacent one of the plates together defining each convoluted flow passage.

13. A device according to claim 12, wherein the recess is formed by an angled grinding or milling operation.

14. A device according to claim 12, wherein the recess is of arched form and is of tapering height and width.

15. A device according to claim 1, wherein the plates of the body have been manufactured using an additive manufacturing process, the plates to form the body with the flow passages formed therein.

16. A flow rate trimming device comprising a body defining a plurality of convoluted flow passages extending between a first surface of the body and a second surface of the body, each convoluted passage comprising a plurality of annular flow passages interconnected by a plurality of radially extending flow passages, wherein at the first surface each radially extending flow passage defines an opening having a lower edge and an upper edge, at least part of the lower edge of a first one of the openings having a closed perimeter edge defined by portions of the body, the first one of the openings being at the same level or lower than at least part of the upper edge of a second one of the openings having a closed perimeter edge defined by other portions of the body, at least part of the upper edge of the first one of the openings being higher than at least part of the upper edge of the second one of the openings.

17. A device according to claim 16, wherein for each convoluted flow passage, the annular and radial flow passages forming the convoluted flow passage are axially aligned with one another within the body.

18. A device according to claim 16, wherein the upper and/or lower edges of the openings are of substantially arched form.

19. A device according to claim 18, wherein the arched form is smoothly curved.

20. A device according to claim 19, wherein the arched form is of part circular or part elliptical form.

21. A device according to claim 18, wherein the arched form is of part polygonal form, made up of two or more straight sections.

22. A device according to claim 16, wherein the convoluted passages have upper and/or lower walls of substantially arched form.

23. A device according to claim 22, wherein at least one of the upper and/or lower edges of the convoluted passages are of substantially arched form.

24. A device according to claim 23, wherein the arched form is smoothly curved.

25. A device according to claim 24, wherein the arched form is of part circular or part elliptical form.

26. A device according to claim 22, wherein the arched form is of part polygonal form, made up of two or more straight sections.

27. A device according to claim 16, wherein the body is composed of a plurality of plates arranged in a stack, each plate having a groove of convoluted shape formed therein, the face of an adjacent plate having a recess formed therein aligned with at least part of the groove, the groove in each plate, and the adjacent recessed face of an adjacent one of the plates together defining each convoluted flow passage.

28. A device according to claim 16, wherein the body is of one piece construction, manufactured using an additive manufacturing process to form the body with the flow passages formed therein.

* * * * *